United States Patent
Yalagandula et al.

(10) Patent No.: US 9,813,328 B2
(45) Date of Patent: Nov. 7, 2017

(54) ASSIGNING SELECTED GROUPS TO ROUTING STRUCTURES

(75) Inventors: Praveen Yalagandula, San Francisco, CA (US); Jayaram Mudigonda, San Jose, CA (US); Jeffrey Clifford Mogul, Menlo Park, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1325 days.

(21) Appl. No.: 13/444,942

(22) Filed: Apr. 12, 2012

(65) Prior Publication Data

US 2013/0272133 A1    Oct. 17, 2013

(51) Int. Cl.
*H04L 12/26* (2006.01)
*H04L 12/761* (2013.01)
*H04L 12/24* (2006.01)

(52) U.S. Cl.
CPC .......... *H04L 45/16* (2013.01); *H04L 41/0893* (2013.01); *H04L 41/12* (2013.01)

(58) Field of Classification Search
CPC ....... H04L 12/185; H04L 45/16; H04L 41/12; H04L 41/0893
USPC .......................................................... 370/238
See application file for complete search history.

(56) References Cited

U.S. PATENT DOCUMENTS

| | | | |
|---|---|---|---|
| 2002/0114286 A1* | 8/2002 | Iwamura et al. | 370/252 |
| 2002/0186652 A1* | 12/2002 | Popovich | 370/218 |
| 2007/0002859 A1* | 1/2007 | Corson | H04L 12/1836 370/390 |
| 2007/0133420 A1* | 6/2007 | Guven et al. | 370/238 |
| 2007/0211720 A1* | 9/2007 | Fuchs | H04L 12/1868 370/390 |
| 2007/0286093 A1 | 12/2007 | Cai | |
| 2008/0056293 A1* | 3/2008 | Robbins | H04L 12/185 370/432 |
| 2009/0037607 A1 | 2/2009 | Farinacci | |
| 2009/0037682 A1 | 2/2009 | Armstrong | |
| 2009/0059832 A1* | 3/2009 | Jhamnani et al. | 370/312 |
| 2010/0118738 A1* | 5/2010 | Koide | H04L 12/18 370/256 |
| 2010/0146093 A1 | 6/2010 | Kuik | |
| 2011/0134918 A1* | 6/2011 | Field | H04L 12/1868 370/390 |
| 2013/0051250 A1* | 2/2013 | Shaffer | H04L 45/22 370/252 |
| 2013/0051387 A1* | 2/2013 | Howe | H04L 65/605 370/390 |

(Continued)

OTHER PUBLICATIONS

CISCO, Designing Secure Multi-Tenancy into Virtualized Data Centers, Dec. 2009 (82 pages).

(Continued)

*Primary Examiner* — Faisal Choudhury
(74) *Attorney, Agent, or Firm* — Hewlett Packard Enterprise Patent Department

(57) ABSTRACT

Selected ones of multiple groups of network entities are assigned to corresponding routing structures, where each of the routing structures defines a set of paths through a network among network entities of a corresponding one of the groups. The assigning considers available multicast resources in communication nodes in the network, and a criterion relating to reducing overall cost in the assignment of the selected groups to the corresponding routing structures.

16 Claims, 5 Drawing Sheets

(56) References Cited

U.S. PATENT DOCUMENTS

2013/0064244 A1* 3/2013 Sathappan et al. ........... 370/390

OTHER PUBLICATIONS

Dalela, CISCO Working Group, Datacenter Network and Operations Requirements, Dec. 2011 (33 pages).
CISCO Virtualized Multi-Tenant Data Center, Version 2.1, Design Guide, Oct. 2011 (68 pages).
Adler, Channelization Problem in Large Scale Data Dissemination, Nov. 2001 (10 pages).
Vigfusson et al., Dr. Multicast: Rx for Data Center Communication Scalability, Apr. 2010 (14 pages).
Al-Fares et al., A Scalable, Commodity Data Center Network Architecture, SIGCOMM'08, Aug. 17-22, 2008 (12 pages).
Al-Fares et al., Hedera: Dynamic Flow Scheduling for Data Center Networks, Apr. 2010 (15 pages).
Greenberg et al., VL2: A Scalable and Flexible Data Center Network, SIGCOMM '09, Aug. 17-21, 2009 (12 pages).
Guo et al., SecondNet: A Data Center Network Virtualization Architecture with Bandwidth Guarantees, ACM CoNEXT 2010 (12 pages).
Jung Ho Ahn et al., HyperX: Topology, Routing, and Packaging of Efficient Large-Scale Networks, SC09 Nov. 14-20, 2009 (11 pages).
Khaled Elmeleegy et al., EtherProxy: Scaling Ethernet by Suppressing Broadcast Traffic, 2009 (9 pages).
Mudigonda et al., NetLord: A Scalable Multi-Tenant Network Architecture for Virtualized Datacenters, SIGCOMM'11, Aug. 2011 (12 pages).
Mudigonda et al., SPAIN: COTS Data-Center Ethernet for Multipathing over Arbitrary Topologies, 2010 (16 pages).
Mysore et al., PortLand: A Scalable Fault-Tolerant Layer 2 Data Center Network Fabric, SIGCOMM'09, Aug. 2009 (12 pages).
networkworld.com, Arista, Blade win top spot in data center switch test, Jan. 18, 2010 (3 pages).
Rodrigues et al., Gatekeeper: Supporting Bandwidth Guarantees for Multi-tenant Datacenter Networks, Jun. 2011 (8 pages).
Shieh et al., Seawall: Performance Isolation for Cloud Datacenter Networks, 2010 (7 pages).

* cited by examiner

ASSIGNING SELECTED GROUPS TO ROUTING STRUCTURES

BACKGROUND

A system can use various communication techniques for sending data to target network entities. Such communication techniques include sending data by unicast to target network entities, where sending data by unicast involves sending individual data units to corresponding target network entities. Another communication technique involves multicasting data to target network entities; in multicasting, a multicast address can be used to allow a particular data unit to be sent to multiple target network entities that are part of a group. Such a group can be referred to as a multicast group, which is associated with the corresponding multicast address.

BRIEF DESCRIPTION OF THE DRAWINGS

Some embodiments are described with respect to the following figures.

DETAILED DESCRIPTION

Figure 1B:
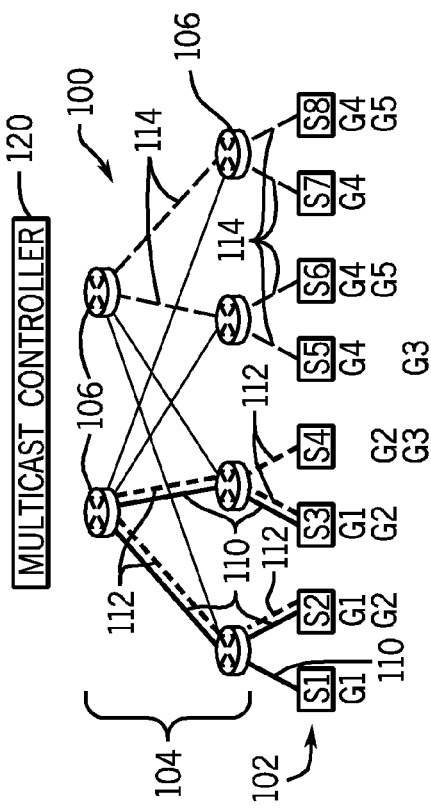
FIGS. 1A-1D are schematic diagrams of example arrangements of network entities, switches, and a multicast controller according to some implementations.

Multicast communications can be used in a system to provide more efficient communication of data with network entities in the system (as compared to unicast communications). A relatively large system (e.g., a data enter, an enterprise network, a cloud network, etc.) can have a relatively large number of network entities. Network entities can include physical machines and/or virtual machines. Examples of physical machines include computers (e.g. server computers, desktop computers, notebook computers, tablet computers, etc.), storage devices, and so forth. A virtual machine can refer to a partition or segment of a physical machine, where the virtual machine is provided to virtualize or emulate a physical machine. From the perspective of a user of application, a virtual machine looks like a physical machine.

A system can also include a number of groups of network entities that can share network resources of a network. Each group of network entities can be independent of other groups of network entities. In some implementations, multiple groups of network entities are provided to allow for functional or performance isolation among the groups (e.g. each group is associated with its respective performance goal and allocated network resources to meet that performance goal). As an example, groups can be in the form of virtual networks, where each virtual network includes a corresponding subset of virtual machines that can communicate with each other through the shared network.

A network entity within a particular group can employ multicasting to communicate data to other network entities in the particular group. A group that uses multicasting to communicate data can define one or more subsets of its members that use multicasts to communicate within such a subset. Such a subset can be referred to as a "multicast group." A network or virtual network can contain one or more multicast groups. The memberships of two or more multicast groups may overlap. With multicasting, a data unit (e.g. a data packet, data frame, etc.) can be directed to a multicast address (e.g. by including the multicast address in a destination address field of the data unit). The multicast address associated with the data unit allows the data unit to be routed by communication nodes in a network to the other network entities of the multicast group. By using multicasting to send a data unit to multiple network entities, the transmission of multiple instances of the data unit to unicast addresses associated with corresponding network entities does not have to be performed. Note that unicasting multiple instances of a data unit to multiple corresponding network entities increases the amount of traffic that is routed through a network to the target network entities, which can reduce available bandwidth of the network, and which can increase the latency for completing the delivery of the data unit to all members of a multicast group.

Communication nodes for communicating data through a network can include switches. A "switch" can refer to any intermediate device that allows data to be passed between other devices. The switch can be a layer two switch, a layer three router, or some other type of intermediate communication device. In the ensuing discussion, reference is made to switches for routing data through a network. However, in other examples, techniques or mechanisms according to some implementations can be applied to networks that employ other types of communication nodes.

To enable multicasting in a network, the switches used in the network have associated multicast resources. A "multicast resource" refers to a resource that is part of a switch that is used by the switch to route multicast data along paths of a network to network entities that are part of the multicast group. In some implementations, the multicast resources include entries of a multicast table. Each multicast table entry is associated with a corresponding multicast address. The multicast table entry specifies the port(s) of the switch to which a received data unit (containing the corresponding multicast address) is to be routed, so that the data unit can be directed to the network entities of the corresponding multicast group. The multicast table entries provided in multiple switches that correspond to a particular multicast address define the collection of paths through the network that a data unit targeted to the particular multicast address is to be routed.

There is a constraint on the amount of multicast resources (e.g. the number of multicast table entries) available in a switch. Thus, in a system that has a relatively large number of groups, there may not be sufficient multicast resources in the switches to support all of the groups that desire to communicate using multicasting. If a switch receives a multicast data unit that has a multicast address that is not in the multicast table of the switch, then the switch may flood the data unit to all ports of the switch except the port at which the data unit was received. Data flooding is a way of communicating a data unit for which a switch does not have information regarding where target network entities are located. By sending the data unit to all ports of the switch except the port at which the data unit was received, the switch effectively sends the data unit across all possible output data paths from the switch to ensure that the data unit is received by target network entities.

Data flooding by multiple switches can quickly increase the amount of traffic in a network, which can result in relatively high consumption of network bandwidth. Data flooding can also consume resources of unintended target network entities, since the network entities receiving data units have to perform filtering to determine whether or not data units are actually targeted to the network entities receiving the flooded data units. Such filtering adds to the processing load of the unintended target network entities.

Figure 1A:
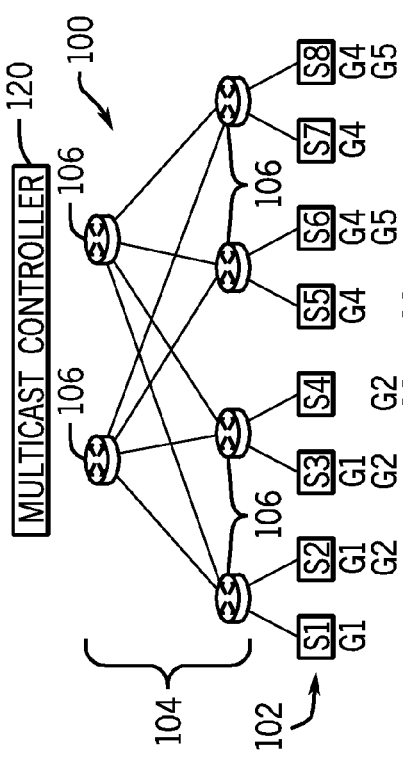

FIG. 1A illustrates an example system 100 (e.g. a data center or some other type of system) that has multiple servers 102 (servers S1 to S8 shown) that are able to communicate over a network 104 that has an arrangement of switches 106 interconnected by various links. In the example of FIG. 1, the network 104 has a two-level FatTree topology. In other examples, the network 104 can have other topologies.

In some examples, each server 102 can include multiple virtual machines, where the virtual machines of the servers 102 can be part of corresponding groups (five groups G1, G2, G3, G4, and G5 are illustrated in FIG. 1). A label Gi (where i=1, 2, 3, 4, or 5) provided by a corresponding server indicates that at least one virtual machine in the server is part of group Gi. If multiple group labels are provided by a particular server, then that particular server has at least a first virtual machine that is part of one of the groups, and at least a second virtual machine that is part of another one of the groups (where the second virtual machine can be the same as or different from the first virtual machine). For example, the group labels G1 and G2 are provided by server S2, which indicates that at least a first virtual machine in the server S2 is part of the group G1, and at least a second virtual machine of the server S2 is part of the group G2.

Within a group Gi, any network entity (e.g. virtual machine) in the group of Gi can send multicast data (over the network 104) to the other network entities (e.g. virtual machines) of the group Gi.

FIG. 1A also shows a multicast controller 120 according to some implementations that can be used to configure the switches 106 and the network entities 102 to enable communication of multicast data among network entities of the respective multicast groups. The multicast controller 120 can be implemented on an individual computing machine, or can be distributed across multiple computing machines.

The paths through the network 104 that interconnect the network entities of a multicast group can be represented by a multicast routing tree (e.g. spanning tree of an L2 Spanning Tree Protocol). In some examples, the multicast routing tree can be a Steiner tree, where the Steiner tree is a minimum spanning tree determined by interconnecting a minimum number of links between network entities.

A multicast routing tree identifies the paths (such as by identifying ports of corresponding switches 106) through which multicast data is to be communicated among network entities of the multicast group. More generally, a multicast routing tree can be referred to as a "routing data structure," which can define a set of paths through a network among network entities of a corresponding multicast group.

As noted above, there can be more groups than there are multicast resources (e.g. multicast table entries) in individual ones of the switches 106. To address such issue, the multicast controller 120 can use predefined criteria for assigning a subset of the groups to corresponding multicast routing trees, such that each of the groups in the subset can communicate using multicasting. However, a group that is not part of the subset (in other words, a group that is not assigned to a multicast routing tree) employs unicasting to communicate data among network entities of such group.

Assuming the number of multicast resources (e.g. multicast table entries) in the switches 106 of FIG. 1A is sufficiently large, then all eligible groups can be assigned to corresponding multicast routing trees to allow such eligible groups to communicate data using multicasting. In examples according to FIG. 1A, the eligible groups are groups that span more than two servers. An "eligible" group is a group that is considered by the multicast controller 120 for assignment to a multicast routing tree such that the group can use multicasting to communicate data. A group that spans two servers or less is not considered for assignment to a multicast routing tree. In the example of FIG. 1A, groups G3 and G5 span only two servers and thus are not considered for assignment to multicast routing trees. However, groups G1, G2, and G4 span more than two servers and thus are considered for assignment to multicast routing trees.

FIG. 1B shows an example where each of the groups G1, G2, and G4 are assigned to respective multicast routing trees (it is assumed that the number of multicast resources available in the switches 106 exceeds the number of eligible groups). The group G1 is assigned to a multicast routing tree 110, the group G2 is assigned to a multicast routing tree 112, and the group G4 is assigned to a multicast routing tree 114.

Note that a multicast routing tree depicted in FIG. 1B passing through a switch 106 uses up a multicast resource (e.g. multicast table entry) of the switch 106. If there is a constraint on the number of multicast table entries in the switches 106, then it may not be possible to assign each of the groups G1, G2, and G4 to a corresponding different multicast routing tree. In a specific example, it is assumed that each of the switches 106 in the network 104 has just one available multicast table entry. Note that this constraint is given as an example, as a switch can have more than one available multicast table entry (e.g. can have hundreds or thousands of available multicast table entries).

In the example where each switch 106 is able to support just one multicast address, if the multicast controller 120 is not aware of the specific arrangement (topology) of the switches 106 of the network 104 (how such switches 106 are connected to network entities in the servers 102), then the multicast controller 120 may decide to assign just one group to a multicast routing tree. Such a multicast controller is not network topology-aware. The multicast controller that is not network topology-aware may adopt the assumption that any given multicast routing tree may pass through every one of the switches, and thus the number of group(s) that can be assigned by such multicast controller to multicast routing tree(s) is equal to the number of available multicast table entries.

Figure 1D:
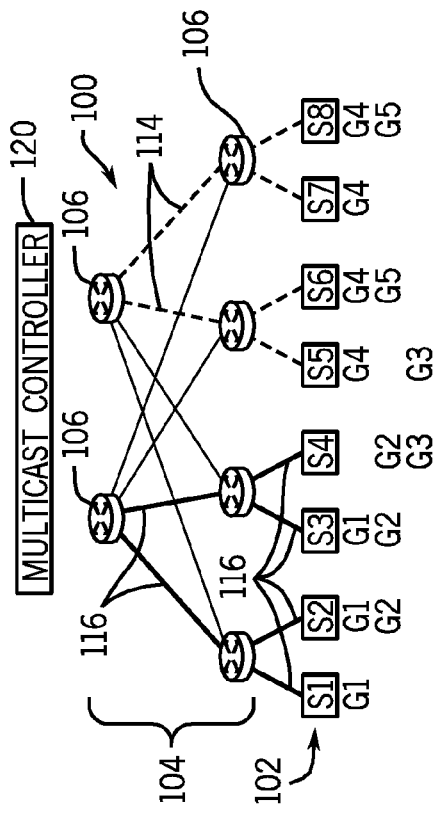
Figure 1C:
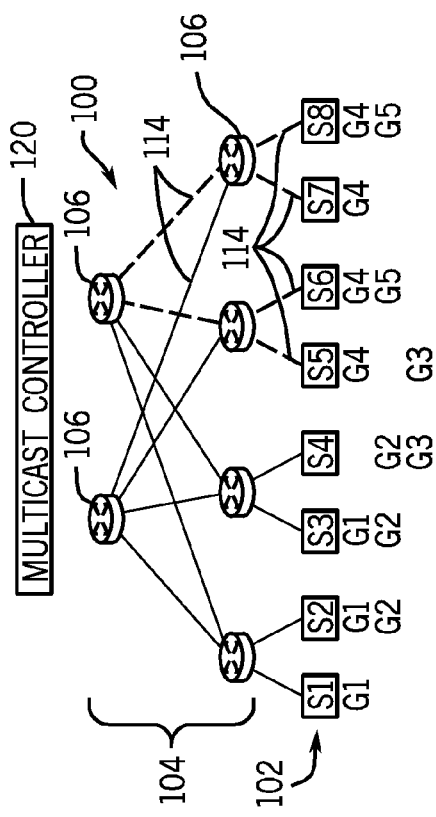

For example, in FIG. 1C, just group G4 is assigned to the multicast routing tree 114 (groups G1 and G2 are not assigned to multicast routing trees). However, in implementations where the multicast controller 120 is network topology-aware (aware of the connection arrangement of network entities and the switches 106), the multicast controller 120 can determine that the groups G1, G2, and G4 can each be assigned to two multicast routing trees 116 and 114 as shown in FIG. 1D, since the arrangement of the switches 106 and the respective network entities in the three groups G1, G2, and G4 allow for the multicast routing trees 116 and 114 to pass through different sets of switches (such that at any given one of the switches, just one multicast table entry is consumed to support the multicast routing trees).

In FIG. 1D, note that the groups G1 and G2 are assigned to share the same multicast routing tree 116. What this means is that a multicast data unit sent by a network entity in either group G1 or group G2 would be sent along the paths identified by the multicast routing tree 116. Some amount of filtering would be performed at the recipient servers to determine to which virtual machines a received multicast data unit should be routed. For example, the server S3 has virtual machines in two groups G1 and G2. Upon receiving a multicast data unit that is sent by a source virtual machine in group G1, the server S3 filters the received multicast data unit to identify whether the data unit is for group G1 or G2. If the server S3 determines that the received multicast data unit is intended for virtual machine(s) in group G1, then the server S3 forwards the received multicast data unit to just the virtual machine(s) of group G1 on server S3.

Figure 2:
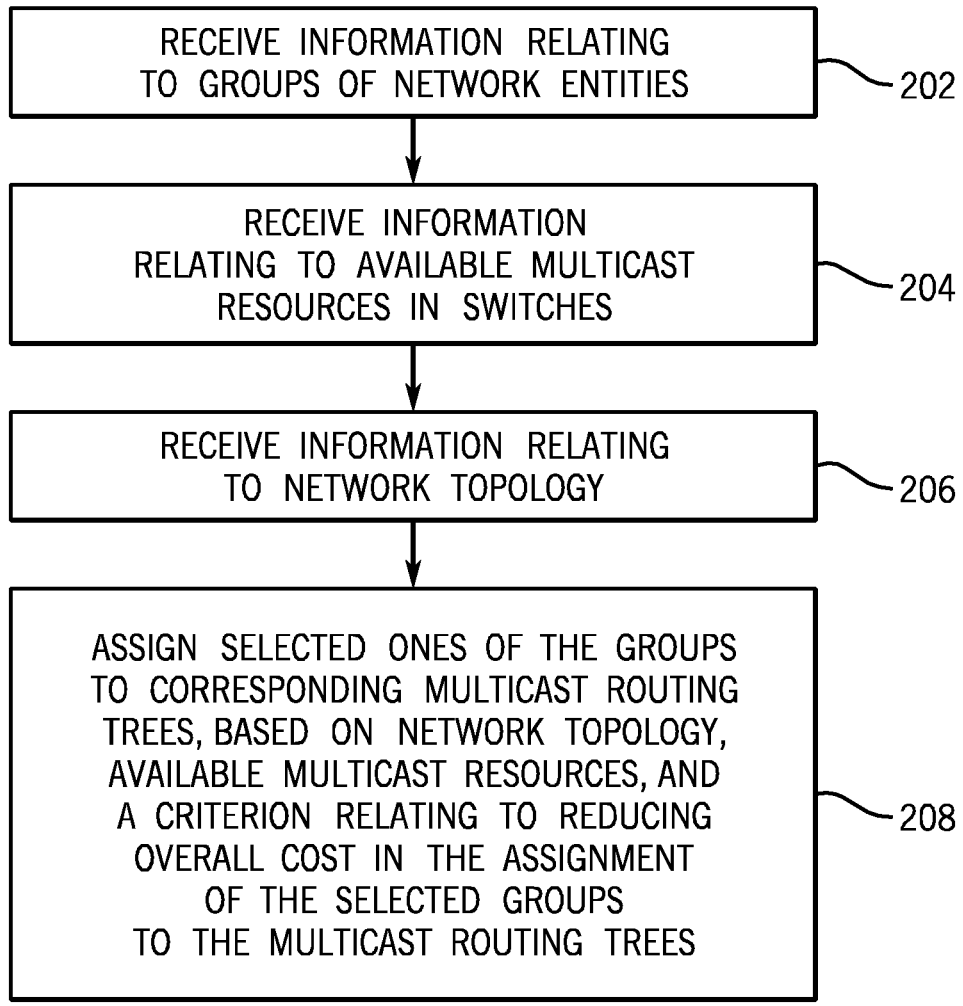
FIG. 2 is a flow diagram of a multicast group assignment process according to some implementations.

FIG. 2 is a flow diagram of a multicast group assignment process according to some implementations, which can be performed by the multicast controller 120, for example. The process receives (at 202) information relating to the groups that are part of a system (such as system 100). The process also receives (at 204) information relating to multicast resources (e.g. multicast table entries) available in individual ones of the switches 106. The process also further receives (at 206) information relating to the network topology (which includes information regarding the arrangement of switches 106 and how these switches 106 are connected to respective network entities).

The process assigns (at 208) selected ones of the groups to corresponding multicast routing trees. The assigning considers the network topology, available multicast resources in individual ones of the switches 106, and also a criterion relating to reducing (e.g. minimizing) overall cost in the assignment of the selected multicast groups to the corresponding multicast routing trees. If there are more groups than there are multicast resources in individual ones of the switches 106, then at least one group is not assigned to a multicast routing tree, or alternatively, multiple groups can be assigned to share a multicast routing tree. For a particular group that is not assigned to any multicast routing tree, the multicast controller 120 configures appropriate ones of the network entities in the particular group to cause such network entities to communicate data using unicasting.

Figure 3:
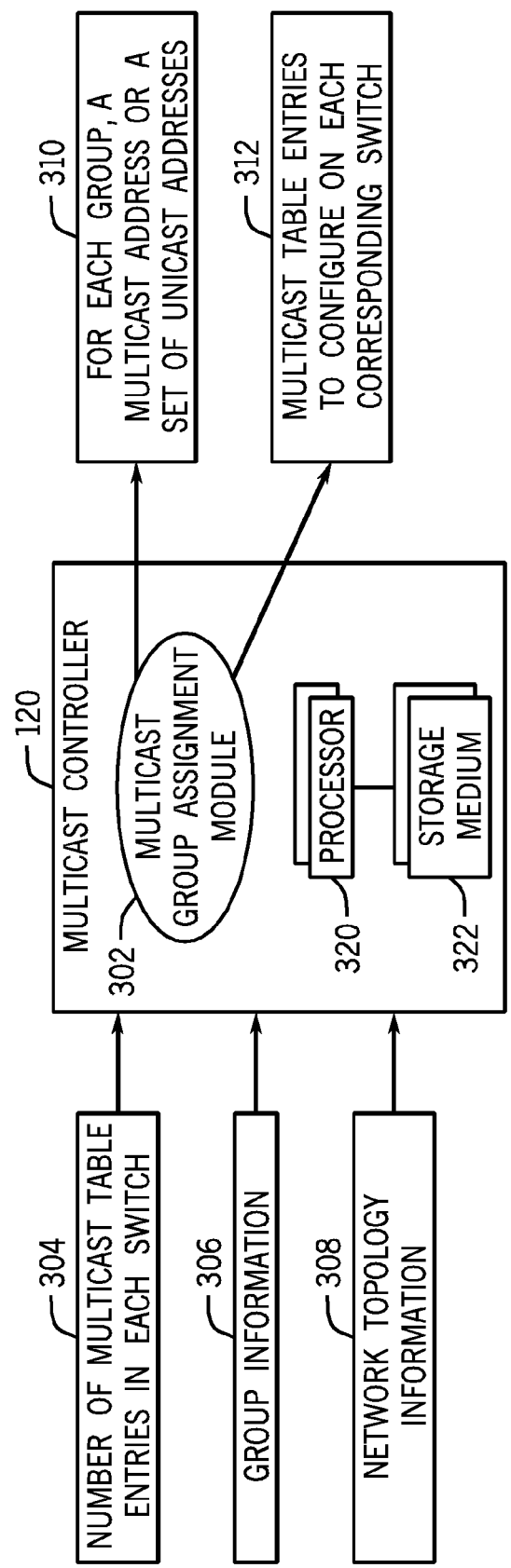
FIG. 3 is a block diagram of an example arrangement that includes a multicast controller according to further implementations.

FIG. 3 illustrates a schematic diagram of an arrangement that includes a multicast group assignment module 302 according to further implementations, which can be executed in the multicast controller 120. The multicast group assignment module 302 receives the following inputs: a number of multicast table entries in each switch (304); group information 306 (which identifies servers that host virtual machines in each of the corresponding groups, and that indicates a traffic rate in each of the groups); and network topology information 308 (which describes the arrangement of the switches 106 and how the switches 106 are connected to respective servers 102). The traffic rate in the group information 306 indicates a rate (e.g. average rate, such as in units of gigabytes per second or other units) at which data units are communicated between network entities in the group. The information 304, 306, and 308 can be received respectively at 204, 202, and 206 in FIG. 2.

The multicast group assignment module 302 produces the following outputs based on the input information 304, 306, and 308. The outputs include output information 310 and output information 312. The output information 310 includes, for each of the groups, either a multicast address or a set of unicast addresses. A group that is assigned to a respective multicast routing tree is provided with a corresponding multicast address to be used for multicasting data to target network entities in the group. In some examples, the multicast address is an Internet Protocol (IP) multicast address.

A group that is not assigned to a multicast routing tree is provided with a set of unicast addresses, which is to be used by a source network entity to send data individually to target network entities using the unicast addresses. In other words, instead of sending just one data unit to a multicast address for receipt by multiple network entities in the group, the source network entity instead sends multiple instances of the data unit to individual ones of the unicast addresses.

The second output information 312 includes information regarding how multicast table entries in the corresponding switches 106 of the network 104 are to be configured to support a respective multicast groups that are assigned to multicast routing trees. As noted above, a multicast table entry in a switch identifies the ports to which a multicast data unit are to be routed to reach target network entities in the corresponding group.

FIG. 3 also shows that the multicast controller 120 can include a processor (or multiple processors) 320, which can be connected to a storage medium (or storage media) 322. The multicast group assignment module 302 is executable on the processor(s) 320. The processor(s) 320 can be part of a single physical machine, or distributed across multiple physical machines.

The following provides further details of a multicast group assignment process according to some implementations.

Consider a network topology including switches S and network entities M (e.g. virtual machines on the servers 102 of FIG. 1A) is represented as a graph G(S∪M, E), where E represents the links interconnecting switches and interconnecting switches and network entities. Assume there are n (n>1) groups $g_1, g_2, \ldots, g_n$ with aggregate rates of traffic $\lambda_1, \lambda_2, \ldots, \lambda_n$, respectively. Let the set of network entities of group $g_i$ be denoted by a function $L(g_i)$.

For each group, the multicast controller 120 can decide to either assign the group to a multicast routing tree or choose to configure the multicast group for communication using unicasting. The cost for each group can be modeled as the number of packet hops consumed in the network for distributing a multicast data unit to all target network entities of the group. Let A be the mapping function decided by the multicast controller 120 that maps each group $g_j$ to either a multicast routing tree in a set of trees T or Ø (the group is assigned to unicast addresses). If $A(g_i)=t$, i.e., a multicast routing tree t is used for the group $g_i$, then the cost $C^A(g_i)$ is the number of links in the tree t. If $A(g_i)=\emptyset$, i.e., unicasting is used, then the cost for communicating a data unit in that group is the sum of the lengths of paths from the source of the data unit to all other members of the group. In some examples, it is assumed that the traffic for each group is generated uniformly at each member of the group. Hence, in case of unicasts, the cost for the group $C^A(g_i)$ can be modeled as the product of the average path length between any pair of network entities in $L(g_i)$ times $(|L(g_i)|-1)$. Note that the minimum possible cost for a group is the number of links in a minimal Steiner tree in graph G that spans all of the servers in that group.

A goal for the multicast controller 120 is to determine (i) a set T of trees on G such that no switch s ∈S is part of more than $k_s$ trees in T ($k_s$ is the number of multicast table entries available on a switch s), and (ii) a mapping A of each group to either at t ∈T or Ø, such that the overall cost $C^A=\Sigma_i C^A(g_i)$. $\lambda_i$ is minimized (or reduced).

Finding a minimal cost assignment for all multicast groups while satisfying the switch constraints is NP-hard. Hence a heuristic can be used that constructs and assigns trees to groups that reduce (or minimize) the overall cost. The network topology-aware multicast group assignment process (such as that provided by the multicast controller 120) tracks the used multicast table entries at each individual switch. For a group, the multicast group assignment process can then compute if it can lay out a new multicast routing tree spanning the members of the group without violating any multicast resource constraints.

The multicast group assignment process considers the groups in the order of their costs. For each group, the technique considers three cases—to use unicast, to lay out a new multicast routing tree, or to extend an already laid out multicast routing tree—and chooses the best option that reduces the overall cost.

Figure 4:
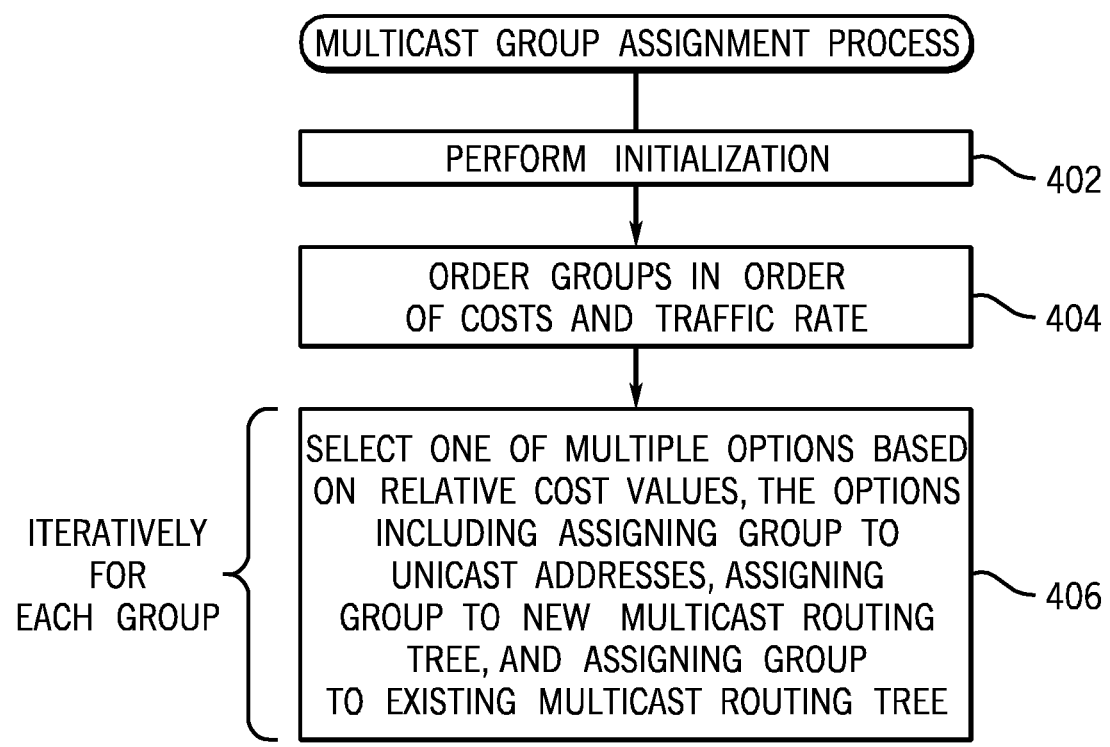
FIG. 4 is a flow diagram of a multicast group assignment process according to alternative implementations.

The following describes tasks that can be performed by the multicast controller 120 according to further implementations. Referring to FIG. 4, the multicast controller 120 (and more specifically the multicast group assignment module 302 of FIG. 3) performs initialization (at 402), where the initialization includes the following: set all groups to use unicast i.e., $\forall i \in [1, n]\ A(g_i)=\emptyset$; and initialize the set of multicast routing trees, $T=\emptyset$.

Thus, initially, none of the groups are assigned to a multicast routing tree. The goal of the process of FIG. 4 is to assign the groups to multicast routing trees that considers the network topology, multicast resource constraints of the individual switches, and a criterion that seeks to reduce overall costs. The process next orders (at 404) groups in non-descending order of their costs and traffic rates (e.g. cost $C^A$ ($g_i$). $\lambda_i$, or a product of the cost and traffic rate), and considers groups in that order. Suppose the sorted order of the groups is $g'_1, g'_2, \ldots, g'_n$ (which can be different from $g_1, g_2, \ldots, g_n$).

From i=1 to n, the multicast controller 120 iteratively considers the following three cases for each group $g'_i$:

(a) Do not assign the group $g'_i$ to a multicast routing tree (the overall cost for this option is represented as $C^A$).

(b) Assign the group $g'_i$ to a new multicast routing tree t, if there exists a tree spanning the servers of this group and does not violate switch multicast resource constraints. The cost for this assignment is represented as $C^{A1}$; the cost can be set to $\infty$ if no such tree can be created.

(c) Among all trees in T that can be extended to include network entities of $g'_i$ without violating switch multicast resource constraints, choose $t_j$ that results in the lowest cost. This option results in multiple groups being assigned to share multicast routing tree $t_j$. The cost for this assignment can be $C^{A2}$; this cost can be set to $\infty$ if no such tree can be found.

The multicast controller 120 selects (at 406) one of the options above based on the relative values of $C^A$, $C^{A1}$, and $C^{A2}$. If $C^A$ is lower than both $C^{A1}$ and $C^{A2}$, then the multicast controller 120 determines that unicasting is the best option for this group $g'_i$, and the group $g'_i$ is not assigned to any multicast routing tree (option (a) is selected).

If $C^{A2} \leq C^{A1}$, then the multicast controller 120 extends the existing tree $t_j$ and sets $A(g'_i)=t_j$, (option (c) is selected).

If $C^{A1}$ is the lowest value, then assigning the currently evaluated group $g'_i$ to a new multicast routing tree (option (b)) can be the lowest cost option, which can reduce the overall cost by $r=\min(C^{A2}, C^A)-C^{A1}$. However, note that assigning a group to a new tree uses up multicast resources on switches and hence may prevent a group further down in the order, $g'_1, g'_2, \ldots, g'_n$, from being assigned to a multicast routing tree. This dilemma can be addressed by considering the cost reduction r' that group $g'_{i+k}$ can achieve if a new tree is created for that group, where k is the minimum of the number of multicast table entries left at any switch in the network. If r≥r', then create a new tree t for the currently evaluated group $g'_i$, add t to T, and set $A(g'_i)=t$. Otherwise, if $C^{A2}<C^A$, extend the existing tree $t_j$ and set $A(g'_i)=t_j$—this latter scenario means that a later group in the order would benefit more from being assigned to the new tree t than the currently evaluated group $g'_i$.

Instead of assigning each group to either a multicast routing tree or a set of unicast addresses, a multicast group assignment process according to alternative implementations can assign the group to a set including several multicast routing trees and unicast addresses. In this case, a network entity of a particular group can send messages to a multicast address even though the particular group is not part of the corresponding multicast routing tree.

The process performed by the multicast controller 120 in assigning groups to corresponding multicast routing trees can be performed as an offline process or an online process. If the process is implemented as an online process, then the multicast controller 120 is able to handle any of the following changes: a network entity joining an existing group, a network entity leaving an existing group, a change in the traffic rate $\lambda_i$ of one or multiple groups $g_i$, and the formation of a new group.

Figure 5:
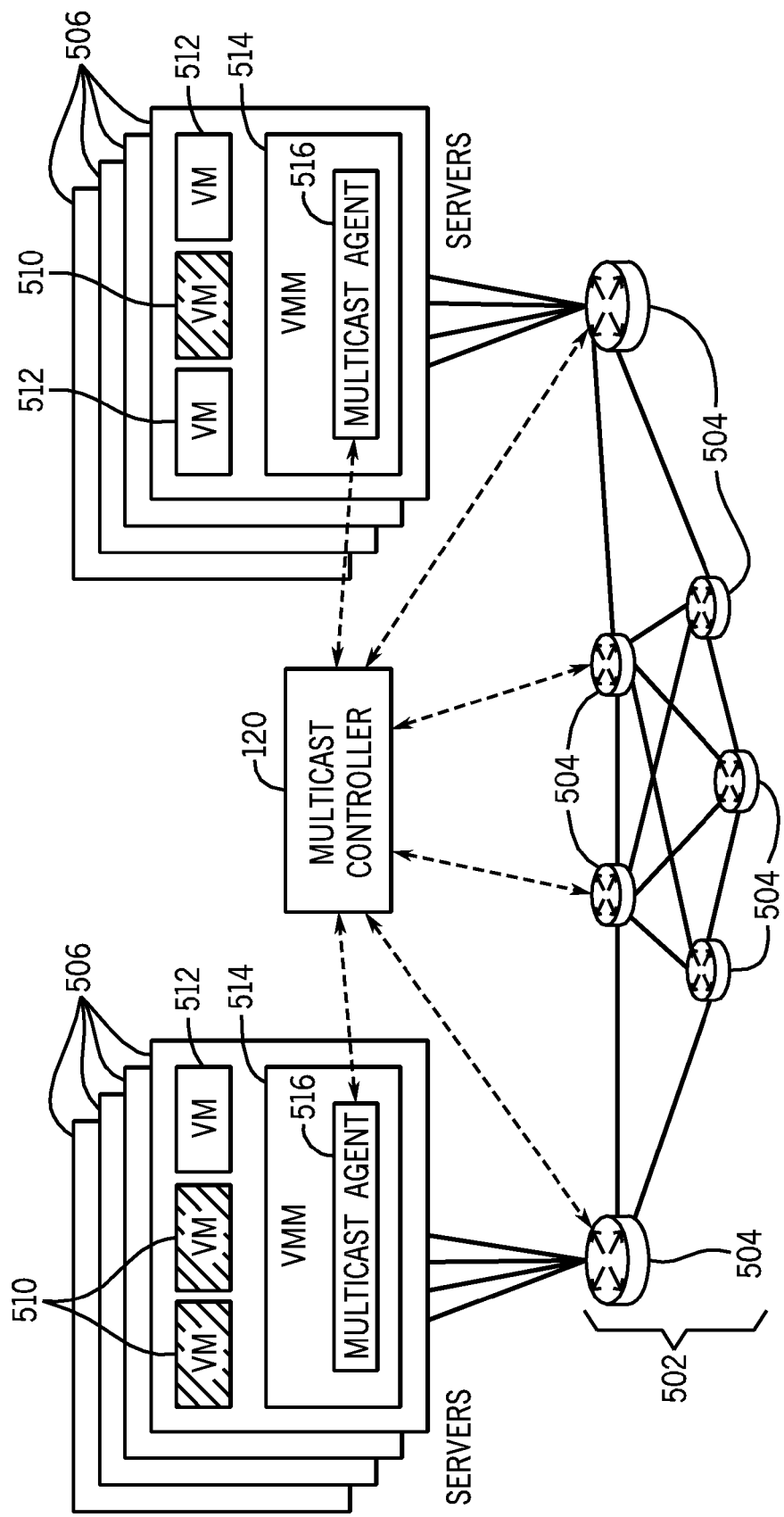
FIG. 5 is a block diagram of an example arrangement according to some implementations.

FIG. 5 illustrates another example arrangement, which includes the multicast controller 120, and a network 502 having switches 504. Additionally, physical machines 506 are connected to the network 502. Each of the physical machines 506 can include virtual machines (VMs). In examples according to FIG. 5, the network entities that are part of respective groups are the VMs. For example, VMs 510 are part of a first group, while VMs 512 are part of a second group.

Each physical machine 506 also includes a virtual machine monitor (VMM) 514, which is also referred to as a hypervisor. The VMM 514 manages the sharing (by virtual machines 510, 512) of the physical resources of each physical machine 506. The VMM 514 virtualizes the physical resources of the physical machine 506. Also, the VMM 514 intercepts request for resources from operating systems in the respective virtual machines 510, 512 so that proper allocation of the physical resources of the physical machine 506 can be performed. For example, the VMM 514 manages memory access, input/output (I/O) device access, and CPU scheduling for the virtual machines. Effectively, the VMM 514 provides an interface between the operating system of each virtual machine and the underlying physical resources of the physical machine 506.

In accordance with some implementations, the VMM 514 includes a multicast agent 516. The multicast agent 516 is able to trap multicast data units sent by a virtual machine at the corresponding physical machine 506. The multicast agent 516 can maintain a mapping table (an example mapping table is set forth below) that maps a tuple (group-ID, mcast-addr) to a set of one or multiple addresses. In the foregoing, "group-ID" represents an identifier of a corresponding group that the virtual machine that sent the multicast data unit is part of, and "mcast-addr" represents the respective multicast address.

In the discussion above, a multicast address that is used to route a data unit through a network to multiple network entities of a group is an "underlying multicast address." This underlying multicast address is included in an address field of a data unit to be routed, and is included in a multicast table entry of a switch to allow the switch to route the data unit to the appropriate next hop. The parameter "mcast-addr" in the mapping table maintained by the multicast agent 516 represents an underlying multicast address.

On the other hand, the parameter "group-ID" of the mapping table maintained by the multicast agent 516 can be considered a "virtual multicast address," which is visible to VMs in a virtual network (but which is not used in routing a data unit by a switch).

As discussed above, in the example of FIG. 1D, groups G1 and G2 are assigned to the multicast routing tree 114, while group G4 is assigned to the multicast routing tree 116. The multicast routing trees 114 and 116 correspond to two distinct underlying multicast addresses. However, note that the VMs in groups G1, G2, and G4 may correspond to three distinct virtual multicast addresses. Alternatively, if the VMs in the groups G1, G2, and G4 are in respective different virtual networks, each such group may use the same virtual multicast address without conflict.

In the example mapping table below, MAC-1, MAC-2, . . . , MAC-n are examples of group-IDs to identify respective groups, and Multicast-IP-1, Multicast-IP-2, . . . , Multicast-IP-n are examples of underlying multicast IP (Internet Protocol) addresses. However, MAC-3 is mapped to a set of unicast IP addresses, e.g. Unicast-IP-9, Unicast-IP-13. In another example, a group-ID (e.g. MAC-19 in the example mapping table below) can be mapped to multiple underlying multicast addresses. More generally, a group-ID can be mapped to a set of addresses that can include one or multiple unicast addresses and/or one or multiple underlying multicast addresses, such as MAC-20 in the example mapping table below.

In some examples, entries in the mapping table can be associated with expiry timers, and an mapping table entry can be removed upon expiration of the respective expiry timer.

<group-ID, mcast-addr>
<MAC-1, {Multicast-IP-1}>,
<MAC-2, {Multicast-IP-2}>,
<MAC-3, {Unicast-IP-9, Unicast-IP-13}>,
. . . ,
<MAC-19, {Multicast-IP-1, Multicast-P-9}>,
<MAC-20, {Multicast-IP-1, Multicast-IP-9, Unicast-IP-15}>,
. . . ,
<MAC-31, {Multicast-IP-1, Multicast-IP-9}>,
<MAC-32, {Multicast-IP-1}>,
. . . ,
<MAC-n, {Multicast-IP-n}>

Also, in the example above, the multicast group identified by MAC-32 is a subset of the multicast group identified by MAC-31.

When a VM of a multicast group t sends out a multicast data unit to a multicast group g, the multicast agent 516 traps the data unit and searches the mapping table for <t,g>, where t can be one of MAC-1 to MAC-n, and g can be one of Multicast-IP-1 to Multicast-IP-n. If no entry in the mapping table is found that contains <t,g>, then the multicast agent 516 asks the multicast controller 120 for relevant addresses. The multicast controller 120 then responds with either a multicast address, for which the controller 120 has set up a multicast routing tree, or a set of unicast addresses that correspond to the physical machines where other VMs of the group g are located. The multicast agent 516 updates the mapping table with this set of addresses and replicates the multicast data unit to each address (either multicast address or unicast addresses) in the set.

The multicast agent 516 can then transmit the data unit from the sending VM using either a multicast address or a set of unicast addresses, depending upon whether or not the sending VM is part of a group assigned to a respective multicast routing tree.

As noted above, there is a possibility that multiple groups are assigned to share a common multicast routing tree. In such scenarios, a destination multicast agent 516 (that receives a multicast data unit addressed to a multicast address) applies filtering to determine which group (of multiple possible groups) the received multicast data unit is for. Such filtering may also have to be performed if a receiving VM is deleted or moved from a physical server before all of the source multicast agents 516 can be informed of such a change.

To enable such filtering, the source multicast agent 516 can include an information element that identifies the group of the sending VM. For example, the source multicast agent 516 can encapsulate the data unit with a header that contains the information element. The information element can include a group-ID, for example. In some examples, the header can be a GRE (Generic Routing Encapsulation) header, as defined by Request for Comments 2784, entitled "Generic Routing Encapsulation," dated March 2000. The information element containing the group-ID can be the Key field of the GRE header, for example. In other implementations, other information elements can be used to carry the group-ID information.

In examples where the group-ID information is carried in a header that encapsulates the multicast data unit, the destination multicast agent 516 can decapsulate the received multicast data unit and use the group-ID and original header fields to determine the correct set of VM(s) that should receive the data unit.

Machine-readable instructions of various modules (e.g. multicast group assignment module 302 of FIG. 3) are loaded for execution on a processor or multiple processors (e.g. 320 in FIG. 3). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   assigning, by a controller comprising a processor, selected groups of a plurality of groups of network entities to corresponding routing structures, where each of the routing structures defines a set of paths for routing multicast data through a network among network entities of a corresponding one of the selected groups, wherein the selected groups form a subset less than all of the plurality of groups,
   wherein the assigning comprises not assigning at least one of the plurality of groups to any of the routing structures,
   wherein the assigning considers a topology of the network, available multicast resources in communication nodes in the network, and a criterion relating to reducing overall cost in the assignment of the selected groups to the corresponding routing structures,
   wherein for a particular group of the plurality of groups:
      determining a first cost associated with not assigning the particular group to any routing structure such that unicast is used for routing data associated with the particular group;
      determining a second cost associated with assigning the particular group to a new routing structure unassigned to another group,
   wherein the assigning is based on comparing the first and second costs;
   when the particular group is not assigned to the any routing structure, configuring, by the controller, a network entity in the particular group to communicate data using unicasting; and
   when the particular group is assigned to the new routing structure, configuring, by the controller, a network entity in the particular group to communicate data using multicasting.

2. The method of claim 1, wherein a multicast resource of a particular one of the communication nodes is consumed if a set of paths of one of the routing structures passes through the particular communication node.

3. The method of claim 1, wherein assigning the selected groups to the corresponding routing structures comprises assigning the selected groups to corresponding multicast routing trees.

4. The method of claim 1, wherein the available multicast resources include available entries of a multicast table in each corresponding one of the communication nodes, and wherein the assigning considers the available entries of the multicast table in each corresponding one of the communication nodes.

5. The method of claim 1, further comprising:
   configuring the network entities associated with a particular group of the plurality of groups that is not in the subset to communicate data in the particular group using unicasting.

6. The method of claim 1, further comprising:
   mapping, by an agent on a physical machine, an identifier of at least one of the plurality of groups to an address set that includes at least one multicast address and/or at least one unicast address.

7. A method comprising:
   assigning, by a controller comprising a processor, selected groups of a plurality of groups of network entities to corresponding routing structures, wherein each of the routing structures defines a set of paths for routing multicast data through a network among network entities of a corresponding one of the selected groups, wherein the assigning considers a topology of the network, available multicast resources in communication nodes in the network, and a criterion relating to reducing overall cost in the assignment of the selected groups to the corresponding routing structures; and
   for a particular group of the plurality of groups:
      determining a first cost associated with not assigning the particular group to any routing structure such that unicast is used for routing data associated with the particular group;
      determining a second cost associated with assigning the particular group to a new routing structure unassigned to another group; and
      determining a third cost associated with assigning the particular group to a multicast routing structure that is also assigned to another group,
   wherein the assigning is based on comparing the first, second, and third costs; and
   wherein assigning the selected groups of the plurality of groups to any of the routing structure comprises:
      when the selected groups are assigned to the corresponding routing structure, configuring, by the processor, a network entity in the selected groups to communicate data using multicasting; and
      when the selected groups are not assigned to any routing structure, configuring, by the processor, a network entity in the selected groups to communicate data using unicasting.

8. The method of claim 7, further comprising:
   in response to determining that the second cost is less than the first cost, determining whether another group would benefit more from being assigned to the new routing structure than the particular group,
   wherein the assigning is further based on determining whether another group would benefit more from being assigned to the new routing structure than the particular group.

9. A system comprising:
   a memory; and
   at least one processor to read instructions from the memory, the processor to:
   for each currently evaluated group of a plurality of groups, iteratively perform:
      determining a first cost associated with assigning the currently evaluated group to a routing structure that defines paths of a network for multicasting data to network entities of the currently evaluated group;
      determining a second cost associated with assigning the currently evaluated group to use unicasting in sending data to the network entities of the currently evaluated group; and
      determine a third cost associated with assigning the currently evaluated group to a routing structure already assigned to another group,
   wherein the at least one processor is to assign selected groups of the plurality of groups to corresponding routing structures based on comparing the first costs, the second costs, and the third costs, and further based on available multicast resources in communication nodes in the network, and a criterion relating to reducing overall cost in the assignment of the selected groups to the corresponding routing structures; and wherein assigning the selected groups of the plurality of groups to any of the routing structure comprises:

when the selected groups are assigned to the corresponding routing structure, configuring, with the processor, a network entity in the selected groups to communicate data using multicasting, and when the selectd groups are not assigned to any routing structure, configuring, with the processor, a network entity in the selected groups to communicate data using unicasting.

10. The system of claim 9, wherein the routing structures comprise multicast routing trees.

11. The system of claim 9, wherein the available multicast resources include available entries of multicast tables in the communication nodes.

12. The system of claim 9, wherein the at least one processor is to further:
configure the communication nodes to enable multicasting for the selected groups.

13. The system of claim 9, wherein the at least one processor is to further:
configure the network entities of a particular group of the plurality of groups not assigned to a routing structure to cause the network entities to use unicasting to send data.

14. An article comprising at least one non-transitory machine-readable storage medium storing instructions that upon execution cause a system to:
assign selected groups of a plurality of groups of network entities to corresponding routing structures, where each of the routing structures defines a set of paths for routing multicast data through a network among network entities of a corresponding one of the selected groups, wherein the assigning comprises not assigning at least one of the plurality of groups to any of the routing structures, wherein the assigning considers a topology of the network, available multicast resources in communication nodes in the network, and a criterion relating to reducing overall cost in the assignment of the selected groups to the corresponding routing structures, wherein for a particular group of the plurality of groups:
determine a first cost associated with not assigning the particular group to any routing structure such that unicast is used for routing data associated with the particular group,
determine a second cost associated with assigning the particular group to a new routing structure unassigned to another group, wherein the assigning is based on comparing the first and second costs; and when the particular group is not assigned to the any routing structure, configuring, by the controller, a network entity in the particular group to communicate data using unicasting; and when the particular group is assigned to the new routing structure, configuring, by the controller, a network entity in the particular group to communicate data using multicasting.

15. The article of claim 14, wherein assigning the selected groups to corresponding routing structures comprises assigning the selected groups to corresponding multicast routing trees.

16. The article of claim 14, wherein the selected groups are in a subset containing less than all of the plurality of groups, the instructions upon execution causing the system to:
configure the network entities associated with a particular group of the multicast groups not in the subset to communicate data in the particular group using unicasting.

* * * * *